United States Patent
Reime

(10) Patent No.: US 6,634,225 B1
(45) Date of Patent: Oct. 21, 2003

(54) RAIN SENSOR USING LOW HARMONIC CONTENT SIGNALS

(75) Inventor: Gerd Reime, Schömberg (DE)

(73) Assignee: Valeo Auto-Electric Wischer und Motoren GmbH (DE)

(*) Notice: Subject to any disclaimer, the term of this patent is extended or adjusted under 35 U.S.C. 154(b) by 0 days.

(21) Appl. No.: 10/019,085

(22) PCT Filed: Apr. 29, 2000

(86) PCT No.: PCT/EP00/03889
§ 371 (c)(1),
(2), (4) Date: Dec. 18, 2001

(87) PCT Pub. No.: WO00/78582
PCT Pub. Date: Dec. 28, 2000

(30) Foreign Application Priority Data

Jun. 18, 1999 (DE) .......................... 199 27 805
Apr. 14, 2000 (DE) .......................... 100 19 112

(51) Int. Cl.⁷ .............................................. G01P 5/00
(52) U.S. Cl. ........................ 73/170.17; 73/170.21; 73/170.16; 73/863; 340/602
(58) Field of Search .................... 73/170.17, 718, 73/715, 194, 170.21, 170.16, 863; 219/522, 203, 543; 318/483, 587, 130

(56) References Cited

U.S. PATENT DOCUMENTS 3,996,797 A       12/1976  Torimaru et al. ............. 73/194
5,777,451 A  *    7/1998   Kobayashi et al. .......... 318/587
6,144,017 A  *   11/2000   Millett et al. ................ 219/522
6,311,005 B1 *   10/2001   Pientka et al. ............... 385/130
6,373,215 B1 *    4/2002   Grabmaier et al. .......... 318/483
6,433,501 B2 *    8/2002   Pientka ........................ 318/483

FOREIGN PATENT DOCUMENTS

| DE | 23 54 100 | 4/1975 |
| DE | 32 03 091 | 8/1983 |
| DE | 33 14 770 | 10/1984 |
| DE | 44 03 221 | 1/1995 |
| DE | 195 26 249 | 2/1996 |
| DE | 197 01 258 | 7/1997 |
| DE | 198 01 745 | 7/1999 |

* cited by examiner

Primary Examiner—Edward Lefkowitz
Assistant Examiner—Alandra Ellington
(74) Attorney, Agent, or Firm—J. Gordon Lewis

(57) ABSTRACT

A rain sensor to detect humidity drops inside an area on a transparent window has at least one transmitting element to emit optical rays into the window and has at least one receiving element to receive at least one part of the emitted optical rays where the intensity of the optical rays received is dependent on the number of humidity drops in the area of the window observed by the rain sensor. So that interference from the rain sensor with radio broadcasts is effectively reduced and, if possible even completely prevented, the rain sensor has a generator to generate an electrical signal which has a lower harmonic content than square-wave signals, preferably a sine-wave electrical signal to power each transmitting element of the rain sensor.

21 Claims, 5 Drawing Sheets

RAIN SENSOR USING LOW HARMONIC CONTENT SIGNALS

BACKGROUND

The present invention relates to a rain sensor to detect humidity drops inside an area on a transparent window, with at least one transmitting element to emit optical rays into the window and with at least one receiving element to receive at least one part of the emitted optical rays, where the intensity of the optical rays received is dependent on the number of humidity drops in the area of the window observed by the rain sensor.

The invention also relates to a procedure for operating a rain sensor to detect humidity drops inside an area on a transparent window, with at least one transmitting element to emit optical rays into the window and with at least one receiving element to receive at least one part of the emitted optical rays, where the intensity of the optical rays received is dependent on the number of humidity drops in the area of the window observed by the rain sensor.

Rain sensors of the type described above are known from the prior art in different embodiments. They are normally used in motor vehicles to permit automatic control of windshield wiper activation depending on the intensity of a rainfall. The rain sensors usually observe a specific area of the windshield and determine the intensity of the rainfall in this area.

The known rain sensors have one or more transmitting elements which emit optical rays in the observed areas of the window. The transmitting elements are configured, for example, as luminescent diodes (light-emitting diodes or LEDs). The optical rays emitted can be in the visible or the invisible wave length range. At least one part of the optical rays emitted is reflected from the observed area onto one or more receiving elements in the rain sensor. The receiving elements are configured, for example, as inversely operated luminescent diodes (LEDs). The receiving elements generate a signal which is dependent on the intensity of the optical rays received. The intensity of the optical rays received is in turn dependent on the number of humidity drops in the area of the window observed by the rain sensor. Examples of humidity drops which can be detected are raindrops, dewdrops, drops of fog, melted snowflakes or melting hailstones.

The receiving elements can, for example, receive the optical rays reflected from the window without humidity drops and register a decrease in the intensity of the optical rays received when humidity drops appear. The receiving elements can also receive only the optical rays reflected from the humidity drops and register an increase in the intensity of the optical rays received when humidity drops appear.

Rain sensors are known which are located at a distance from the observed window. The optical rays pass across an air gap from the transmitting elements to the window or from the window to the receiving elements respectively. Rain sensors of this type have the advantage that they can monitor a relatively large area and that the observed area can be selected to be exactly in the field of vision of the driver without the rain sensor interfering with the driver's view.

Another embodiment of rain sensors is attached directly to the window in the area to be observed with the assistance of a flexible adhesive layer. The adhesive layer has firstly a mounting function, attaching the rain sensor securely to the window and, secondly, a compensating function, offsetting irregularities on the window or the rain sensor and locating the rain sensor on the window without entrapped air.

The adhesive layer consists preferably of silicone and has almost the same refractive index as the window being observed. The optical rays emitted at a specific angle by the transmitting elements into the adhesive layer are almost not deflected at all at the transition from the adhesive layer into the window being observed. However, at the transition from the window to the outside air there exists a relatively large difference in the refractive indices, so that the optical rays for the most part are totally reflected in the direction of the receiving elements at the transition of window/air. The receiving elements receive the totally reflected optical rays and generate a signal which is dependent on the intensity of the optical rays received.

If humidity drops are present on the window, the result in the area of the drops is a transition of window/drops instead of a transition of window/air, which results in a change in the difference in the refractive indices in the area of the drops. At the transition of window/drops, the optical rays are no longer totally reflected in the direction of the receiving elements, but totally reflected in other directions, or they even pass out of the window into the humidity drops. With this type of rain sensor, if there are humidity drops on the window, optical rays with a lower intensity are received and the signal from the receiving elements changes accordingly.

The known rain sensors are operated with a supply voltage, usually a DC voltage, which is converted in the rain sensor by an oscillator into a square-wave signal with a specific frequency to power the transmitting elements. The frequency is in the range of several kHz, for example, 30 kHz. The transmitting elements powered by the square-wave signal emit optical rays with the frequency of the square-wave signal. The receiving elements receive optical rays and generate a signal which also has this frequency. The effect of humidity drops on the window being observed is a change in amplitude in the signal from the receiving elements. A determination is made concerning the number of humidity drops on the window from the change in amplitude of the signal. The square-wave signal powering the transmitting elements can therefore be described as a carrier signal, to which a signal dependent on the number of humidity drops on the window can be up modulated by changing the amplitude.

Finally, rain sensors are also known from the prior art which have two signal paths, each having one or several transmitting elements. The transmitting elements for the two signal paths emit optical rays alternately. The receiving element(s) alternately receive(s) optical rays which were emitted by the transmitting elements of the one and the other signal path. The signals from the receiving elements are fed to a comparator which creates an output signal from the difference between the signals. The output signal is dependent on the change in amplitude of the signal of one signal path relative to the amplitude of the signal of the other signal path. If no humidity drops are present on the window in the area being observed, the output signal of the comparator is, so to speak, a signal with the same frequency as the square-wave signal powering the transmitting elements, but with an amplitude of zero, in other words, a DC signal.

The rain sensors known from the prior art have the disadvantage that they radiate electromagnetic waves during operation, specifically in the long-wave range, that is to say, harmonics in a frequency range of up to several hundred kHz. This causes interference in radio broadcasts, particularly in this frequency range. The interference affects radio broadcasts particularly when the rain sensor is located in the proximity of a receiving antenna which is being used for the radio broadcast, so that the disruptive electromagnetic waves from the rain sensor affect the antenna directly. The disruptive electromagnetic waves from the known rain sensor can be heard as a continuous whistling in an automobile radio. Similarly, strong external electromagnetic fields which are created in the vehicle interior, for example, by the use of mobile telephones, can result in a disruption in the operation of the known rain sensor.

SUMMARY

It is therefore desirable for the present invention to design and develop a rain sensor of the type described above with the purpose of effectively reducing interference from the rain sensor with radio broadcasts, if possible even preventing interference completely.

The invention proposes using the rain sensor described above as a starting point, in that the rain sensor possesses means to generate an electrical signal which has a lower harmonic content than square-wave signals, preferably a sine-wave electrical signal, to supply the one or each transmitting element of the rain sensor. The means to generate the electrical signal with a low harmonic content is, for example, an oscillator designed as a sine-wave generator.

As part of the invention it has been ascertained that the electromagnetic waves radiated by the known rain sensors which can result in interference with radio broadcasts have their origin in the square-wave signal that is used to power the rain sensor transmitting elements. The square-wave signals have a relatively high harmonic content. The harmonics result in radiation of the disruptive electromagnetic waves. For this reason, the transmitting elements of the rain sensor in accordance with the present invention are supplied with an electrical signal which has a lower harmonic content than square-wave signals, ideally with a sine-wave signal. The rain sensor has appropriate means, preferably a sine-wave oscillator, to generate the electrical signal. The oscillator converts a power supply signal applied to the rain sensor, preferably a DC voltage, into the sine-wave signal. All the signals processed in the rain sensor should also be almost free of harmonic content.

Electrical signals with a low harmonic content could theoretically be generated by a microprocessor. However, a microprocessor operates internally with square-wave signals which generate electromagnetic waves and would result in interference with radio broadcasts. A microprocessor would not be suitable to achieve the object. For this reason a special electrical circuit is proposed under the invention which dispenses completely with square-wave signals.

During operation, the rain sensor under the invention radiates—if at all—only electromagnetic harmonics of extremely low power. Consequently, interference with radio broadcasts—even if the rain sensor is located in the proximity of a receiving antenna—can be effectively reduced or even prevented completely. With the rain sensor under the invention, harmonic content compression of up to 60 dB can be achieved, compared with known rain sensors which are operated with square-wave signals.

Furthermore, the rain sensor under the invention is extremely insensitive to interference from external electromagnetic fields, since an amplifier on the receiver side can be designed in such a way that only the fundamental wave of the signal is amplified. The harmonic contents above the fundamental wave to be amplified can be filtered out by means of suitable filters and are thus not amplified. The harmonic contents of an external square-wave signal are not detected by the rain sensor under the present invention.

The sine-wave electrical signal can be configured as a current or as a voltage. Powering the transmitting elements with a sine-wave electrical signal has the advantages cited, independently of the embodiment of the rain sensor. The rain sensor under the invention has to be adapted to operate with a sine-wave electrical signal in order ensure correct and reliable rain sensor operation. The adaptation is necessary because of the different characteristics of square-wave and sine-wave signals.

As the result of some design changes to the rain sensor of the invention compared with the known rain sensors which operate with square-wave signals, interference with external radio broadcasts from disruptive electromagnetic waves emitted by the rain sensor and interference with the rain sensor itself by external electromagnetic fields can be further reduced.

In accordance with an advantageous development of the present invention it is proposed that the rain sensor has several transmitting elements assigned to two signal paths and a comparator to compare the intensity of the optical rays from each signal path received by the one or each receiving element relative to each other. Each of the signal paths comprises a transmission circuit and a receiving circuit. The receiving element(s) receive(s) at least one part of the optical rays emitted by the transmitting elements (the rays reflected or refracted at a drop on the windshield) and generate two time-multiplexed electrical signals whose amplitudes are dependent on the intensity of the optical signals received. Thus, the amplitude of the electrical signals is a measure of the intensity of the optical rays received by the one or by each receiving element. To compare the intensity of the optical rays received, the time-multiplexed signals are fed to the comparator, which compares the amplitudes of the signals.

As an indicator of the number of humidity drops on the window, a comparison of the intensity of the optical rays emitted by the transmitting elements of the one or the other signal path and then received, yields not an absolute, but a relative output signal at the output of the comparator (known as differential measurement). If humidity drops are present on the window under observation, the amplitude of both electrical signals from the receiving elements changes. If no humidity drops are present on the window, or with amplitudes from both elements of the rain sensor that are corrected to each other, the two signals are the same. If the differential of the two signals is created by the comparator, the result at the output of the comparator is an output signal with zero amplitude. As soon as humidity drops are present on the window, the output signal has an amplitude deviation of zero dependent on the number of humidity drops. Zero in this case can be a specifiable reference voltage.

In addition, a phase-shift circuit can be provided to set a specific value for phase-shifting of the two sine-wave electrical power supply signals. The phase shift of the two signals is preferably 180°. The transmitting elements of the two signal paths are operated opposite to one another, that is to say, when the transmitting elements of one signal path are at their brightest, the transmitting elements of the other signal path are at their darkest.

In accordance with another advantageous development of the present invention, it is proposed that the rain sensor has a first controller to regulate the amplitude of the individual sine-wave electrical signals emitted such that the output signal of the comparator assumes a specifiable value (e.g.

zero). To adjust the amplitudes of the sine-wave electrical signals, actuators are located in the transmission circuits for sine-wave output power for the transmitting diodes, which are energized by the first controller. The first controller detects the output signal from the comparator and creates corresponding signal variables to energize the actuators. The first controller is preferably designed as a PID controller and has damped settling characteristics (settling time about 2–3 seconds). Settling time for the control loop is so fast that no separate power-on circuit is needed in the case of the rain sensor under the invention. This regulation through the first controller is necessary to permit differential measurement. The control loop of the first controller comprises almost the entire rain sensor with the coupling of the transmission circuit to the receiving circuit through the optical rays. The first controller corrects the two signal paths to each other.

It is advantageous for the rain sensor to have means to compensate for temperature. The temperature compensation means compensates for the effects of temperature fluctuations on the generation of the amplitudes of the sine-wave electrical signals in the two signal paths, which are shifted by 180°. Without regulation, a temperature change in the rain sensor leads to a change in the amplification factor of the oscillator, which results in a change in the amplitude of the sine-wave signal. A change in temperature is compensated for by regulation. Since the sine-wave signal has to be located within a range restricted by an upper limit and a lower limit so that the rain sensor operates correctly and reliably, that part of the peaks of the sine-wave signal which exceed this range would have to be chopped off. In the case of a square-wave signal, this would have no negative consequences on the ability of the rain sensor to function, since a chopped-off square-wave signal still represents a square-wave signal. If, however, as in the case of the rain sensor under the invention, a sine-wave signal is used to power the transmitting elements, the sine-wave signal with chopped-off peaks would have a shape that is similar to that of a square-wave signal. The chopped-off sine-wave signal would have relatively strong harmonics. Consequently, the rain sensor operated with the chopped-off sine-wave signal would cause interference with radio broadcasts.

In accordance with another advantageous development of the invention, it is proposed that the rain sensor has an additional controller for the joint regulation of both amplitudes of the sine-wave electrical signals in such a way that at least one of the electrical signals always has the maximum amplitude. The control loop with the additional controller is superposed on the control loop with the first controller. The additional controller acts equally on actuators located in the transmission circuits to modify the amplitude of the sine-wave electrical signals.

Under ideal conditions, with a dry window and symmetry in both signal paths, the sine-wave electrical circuits for both signal paths have an amplitude of 100%. In the event that a drop falls on the windshield in the measurement area of the rain sensor, the drop results in a change in the intensity of one of the optical rays received by the receiving element, in a change in the amplitude of the corresponding electrical output signal from the receiving element, and ultimately in a deviation of the output signal of the comparator from the specified value. This deviation is detected. In order to regulate the output signal back to the constant value, the first controller goes into action and increases the amplitude of one sine-wave electrical signal (e.g. to 105%) while the amplitude of the other signal is reduced (e.g. to 95%). Since an amplitude greater than 100% causes a restriction of the signal and thus creates harmonics, the additional controller cuts in and reduces the increased amplitude from 105% to 100% (the other amplitude is then at 90%). The efficiency of the rain sensor under the invention can be decisively increased by means of the additional controller because at least one of the signal paths is always operating at the maximum efficiency of 100%. In addition, with the assistance of the additional controller the sine-wave signal is prevented from running into an upper limit. This ensures a sine-wave signal shape with the least possible harmonic content.

In accordance with a preferred embodiment of the present invention, it is proposed that the rain sensor has a receiving element to receive at least one part of the optical rays emitted by the one or each transmitting element. With the use of several transmitting elements grouped in two signal paths and the use of only one receiving element in the rain sensor, the receiving element receives alternating optical rays which were emitted by the transmitting elements of one signal path and the other signal path. The receiving element receives the optical rays through a time multiplexing process (known as time-division multiple-access or TDMA). The use of only one receiving element has the advantage that changes in or interference with the rain sensor receiving range have an equal effect on the signals generated by the receiving elements of both signal paths. Since both signal paths are operated exactly opposite each other, the changes and interference balance each other and are no longer present in the output signal from the comparator.

In accordance with a preferred embodiment of the invention, it is proposed that the rain sensor have a window discriminator to detect deviations in the comparator output signal from the constant value and to put out a corresponding rain sensor output signal. The task of the window discriminator is to create a rain sensor output signal from the comparator output signal which can then be evaluated in a known way by a vehicle control module or elsewhere. The comparator output signal has an amplitude and frequency of occurrence which is dependent on the number and size of the humidity drops on the window screen. The comparator output signal can be a square-wave signal which fluctuates between a HI level and a LO level. The interference level of this square-wave signal is extremely low since it has relatively a low frequency and low power. The output signal of the window discriminator is evaluated specifically with respect to its frequency and its mark-to-space ratio.

It is advantageous if the rain sensor has a synchronous demodulator which divides the signal received by the receiving element into two differential signals, where each of the signals comprises specific half-waves of the signal received. An amplifier can be located between the receiving element and the synchronous modulator so that the synchronous demodulator divides the received signal into two differential signals. It is advantageous for the sine-wave signal generated by the oscillator to be fed to the synchronous demodulator so that the synchronous demodulator knows the precise oscillation period of the sine-wave signals and can divide the received signal into a differential signal which is allocated to the first signal path, and a differential signal which is allocated to the second signal path.

In accordance with a preferred embodiment of the present invention, it is proposed that the rain sensor have eight transmitting elements, which are grouped in two signal paths and which are arranged around a centrally located receiving element at a specific radius to one another. Preferably the transmitting elements are located at equal angular intervals to each other. The transmitting elements for the two signal paths are preferably arranged alternately, that is to say, a transmitting element of one of the signal paths next to a transmitting element of the other signal path. The one or each transmitting element is advantageously constructed as a luminescent diode (LED). Similarly, the one or each receiving element is advantageously constructed as a luminescent diode (LED). The optical rays emitted by the transmitting elements are preferably configured as infrared (IR) rays.

An additional object of the present invention is to design and develop a process of the type described above with the purpose of effectively reducing interference from the rain sensor with radio broadcasts, if possible even preventing it completely.

In order to achieve this object, the invention proposes, using the procedure described above as a starting point, that the one or each transmitting element of the rain sensor is powered by an electrical signal which has a lower harmonic content than square-wave signals. The one or each transmitting element of the rain sensor is/are advantageously powered by a sine-wave electrical signal.

In accordance with an advantageous development of the invention, it is proposed that all signals in the rain sensor are configured as signals with a lower harmonic content than square-wave signals. All signals in the rain sensor are advantageously configured as sine-wave signals.

BRIEF DESCRIPTION OF THE DRAWING

In the following description, a preferred embodiment of the present invention is explained in greater detail based on the drawings in which.

DETAILED DESCRIPTION

Figure 1:
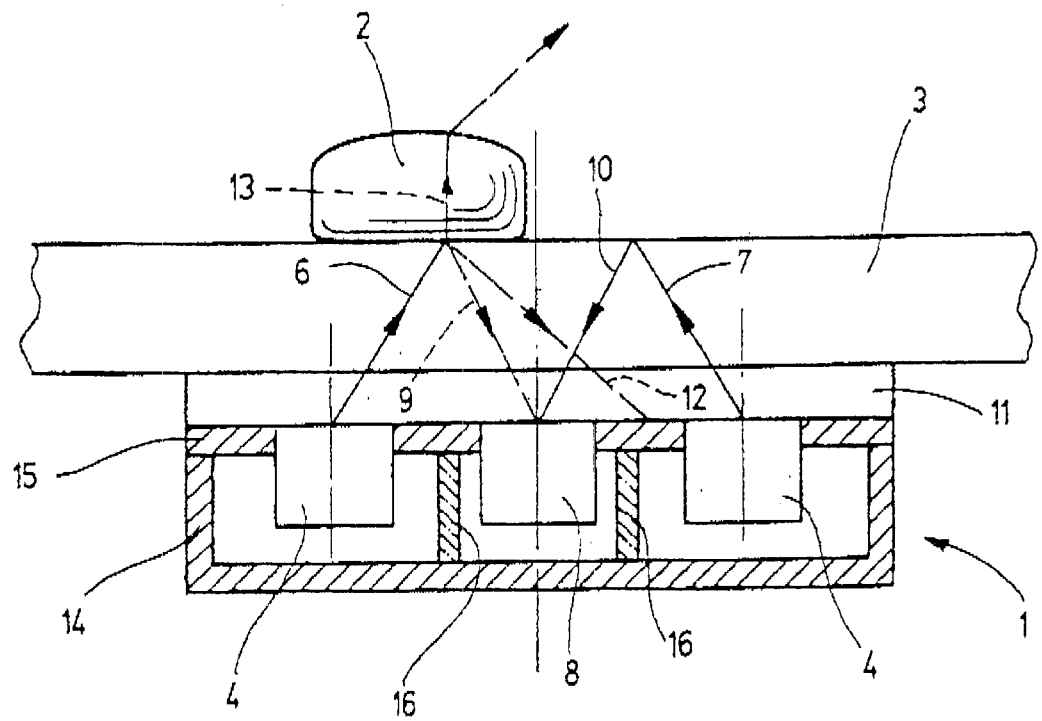
FIG. 1 shows in cross section a rain sensor in accordance with a preferred embodiment of the invention.

In FIG. 1 a rain sensor in accordance with a preferred embodiment of the invention is identified in its entirety with the reference number 1. The rain sensor 1 is used to detect humidity drops 2, specifically raindrops, inside a specific area on a transparent window 3. The rain sensor 1 is preferably employed in an automobile in order to measure the number of humidity drops 2 on the vehicle windshield and to control the operation of the windshield wipers depending on the number of the humidity drops 2, that is to say, on the intensity of a rainfall.

The rain sensor 1 has eight transmitting elements 4, 5 to emit optical rays 6, 7 into the window 3. The transmitting elements 4, 5 are positioned at equal angular distances in a circle around a centrally located receiving element 8. The receiving element 8 is used to receive optical rays 9, 10. The intensity of the optical rays received is dependent on the number of humidity drops 2 in the area of the window observed by the rain sensor 1.

The rain sensor 1 is attached to the inside of the window 3 by means of an adhesive layer 11, which consists preferably of silicone. The adhesive layer has firstly, a mounting function attaching the rain sensor securely to the window and, secondly, a compensatory function offsetting irregularities on the window or the rain sensor and locating the rain sensor on the window without entrapped air. The adhesive layer 11 has approximately the same refractive index as the window 3. The transmitting elements 4, 5 emit optical rays 6, 7 which go through the adhesive layer 11 and pass the transition of the adhesive layer 11/window 3 almost unrefracted.

If there is no humidity drop 2 on the outside of the window 3, the emitted optical rays 7 are fully reflected at the transition of the window 3/air in the direction of the receiving element 8 because of the different refractive indices. On the other hand, if there is a humidity drop 2 on the outside of the window 3, the original window 3/air transition becomes a transition of the window 3/humidity drop 2. Because of the changed refractive indices at the transition of the window 3/humidity drop 2, the result is a change in reflective characteristics. Now only a small part 9 of the optical rays emitted 6 is reflected in the direction of the receiving element 8. Another part 12 of the emitted rays 6 is reflected to the side of the receiving element 8 and still another part 13 of the emitted rays 6 passes out of the window 3 and, being refracted, into the humidity drop 2. So if a humidity drop 2 is located on the window 3 in the area under observation, the optical rays 9 received by the receiving element 8 have a lesser intensity than without a humidity drop 2 on the outside of the window 3.

The transmitting elements 4, 5 are configured as luminescent diodes (light-emitting diodes or LEDs). The optical rays emitted 6, 7 and therefore the optical rays received 9, 10 can be in the visible or invisible frequency range. In the present embodiment the optical rays 9, 10 are in the infrared (IR) range. The receiving element 8 is also configured as a luminescent diode or LED.

Figure 2:
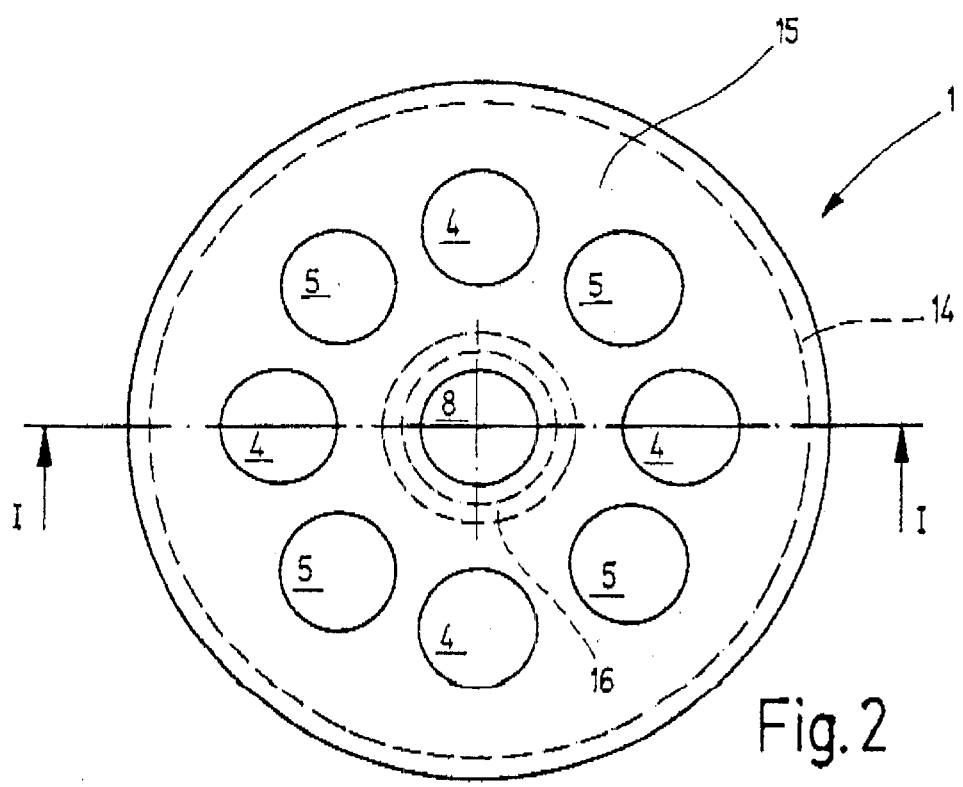
FIG. 2 is a front view of the rain sensor of FIG. 1.
Figure 3:
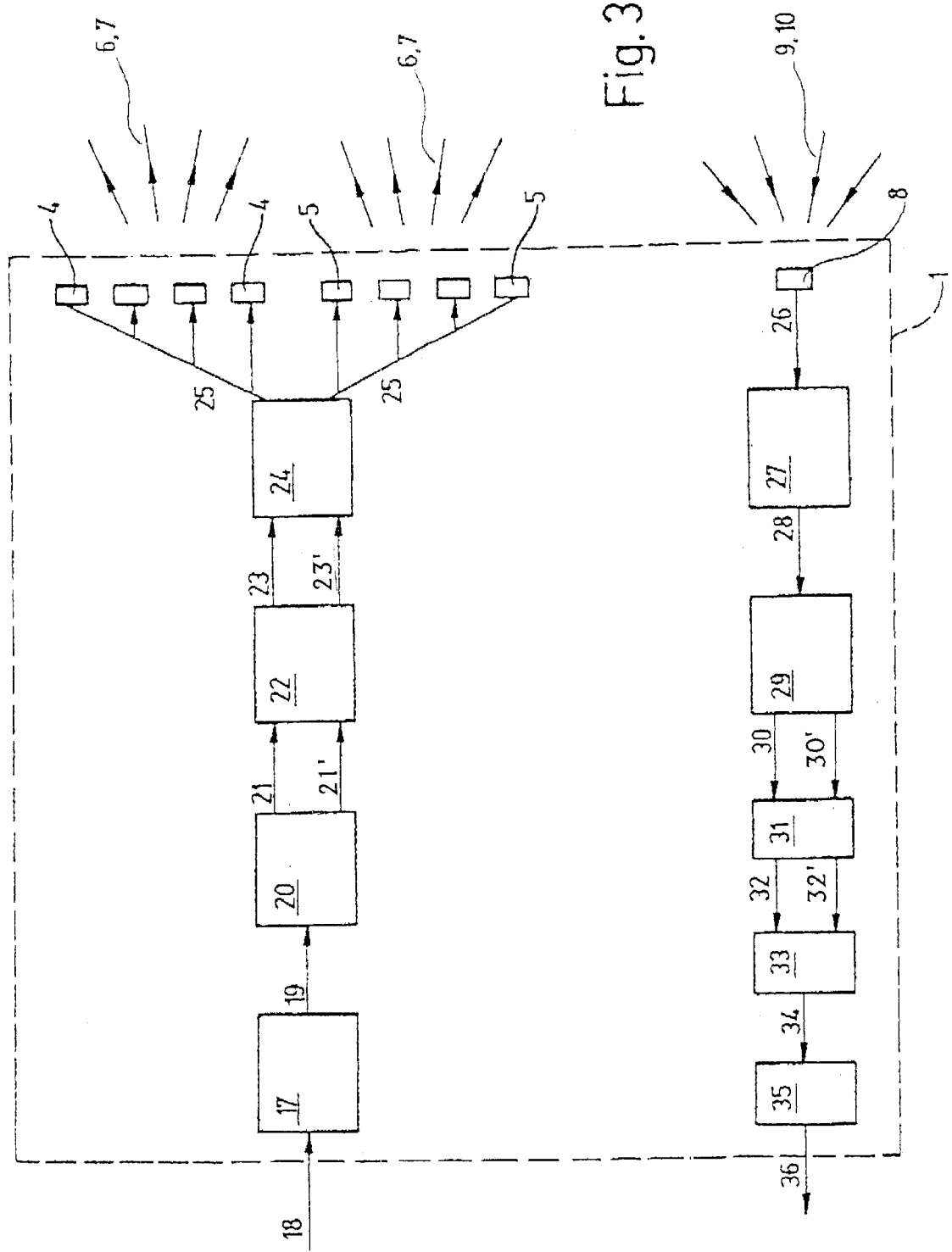
FIG. 3 shows a schematic assembly of a rain sensor in accordance with an initial preferred embodiment of the invention.

The transmitting elements 4, 5 are divided into two signal paths. One signal path comprises a transmission circuit and a receiving circuit. One transmission circuit contains the transmitting elements 4 and the other transmission circuit contains the transmitting elements 5. The transmitting elements 4 are positioned alternately with the transmitting elements 5 around the receiving element 8 (see FIG. 2). The transmitting elements 4, 5 are powered by sine-wave voltage signals 25. For this, a sine-wave voltage signal 19 is generated in an oscillator 17 (see FIG. 3) from a DC supply voltage applied at the rain sensor 1. The sine-wave signal 19 is divided into two sine-wave voltage signals 21, 21' by means of a voltage divider 20, in order to supply the transmitting elements 4, 5 of the two transmission circuits. Then the amplitudes of the two sine-wave voltage signals 21, 21' are regulated by means of a controller 22, depending on the temperature in the rain sensor 1, to a constant value within the permissible range for the sine-wave voltage signals 21, 21' of the rain sensor 1. The sine-wave signals 23, 23' regulated to a constant amplitude value are then adjusted by means of a phase-shift circuit 24 to a phase shift of 180 degrees relative to each other. The sine-wave signals 25, 25' which have been phase-shifted by 180 degrees are present at the output of the phase-shift circuit 24.

The transmitting elements 4 of one of the transmission circuits are consequently operated exactly opposite the transmitting elements 5 of the other transmission circuit. When the transmitting elements 4 are at their brightest, the transmitting elements 5 are at their darkest. The sine-wave signals 19, 21, 21', 23, 23' and 25 all have the same frequency, which is in the kHz range, i.e., in the case of the present embodiment, in the range of 15 to 20 kHz. The transmitting elements 4, 5 emit the optical rays 6, 7.

The receiving element 8 alternately receives optical rays 9, 10 which were emitted by the transmitting elements 4 of one transmission circuit and by the transmitting elements 5 of the other transmission circuit. A signal 26, which is initially amplified in a pre-amplifier 27, is generated at the output of the receiving element 8.

The signal 28, which has been amplified in the pre-amplifier 27, is passed on to a synchronous demodulator 29, which synchronously demodulates the amplified sine-wave signal 28 operating with sine-waves. The amplitudes of the demodulated signals 30, 30' are dependent on the intensity of the optical rays 9, 10 received. The intensity of the optical rays 9, 10 received is in turn dependent on the number of humidity drops 2 in the area of the window 3 observed by the rain sensor 1.

The demodulated signals 30, 30' are passed on to a controller 31 which corrects the two signal paths to each other. The controller 31 is configured as a PID controller. The signals 32, 32' from the controller 31 are fed to a comparator 33 which creates an output signal 34 from the differential between signal 32 received from one transmission circuit and signal 32' received from the other transmission circuit. The output signal 34 is therefore dependent on the change in amplitudes of the signals 32, 32' from the transmission circuits. If no humidity drops 2 are present on the window 3 in the observed area, the output signal 34 from the comparator 33 is, so to speak, a signal with the same frequency as the sine-wave signal 25 to power the transmitting elements 4, 5, but with an amplitude of zero, that is, a DC voltage signal.

The output signal 34 from the comparator 33 is passed on to a window discriminator 35 which converts the output signal 34 into a rain sensor output signal 36. The output signal 36 changes its level if the signal 34 departs from a specified window. The resulting output signal 36 is a square-wave signal whose frequency and mark-to-space ratio are evaluated. It is conceivable that the output signal from the window discriminator 35 can be inverted by means of an output driver (not shown), for example, a transistor in an open-collector circuit, so that the output signal 36 of the rain sensor 1 is the inverted output signal of the window discriminator 35.

The rain sensor 1 has an opaque housing 14 in which the transmitting elements 4, 5, the receiving elements 8 and the electronic elements, namely the oscillator 17, the voltage divider 20, the controller 22, the phase-shift circuit 24, the pre-amplifier 27, the synchronous demodulator 29, the controller 31, the comparator 33, and the window discriminator 35, are located. The housing 14 is sealed with a light-tight cover 15. Openings are provided in the cover 15 for the transmitting elements 4, 5 and the receiving element 8. The transmitting elements 4, 5 and the receiving element 8 are in a light-tight fit in the openings. The receiving element 8 is sealed from the transmitting elements 4, 5 by means of a ring 16 made of an flexible, light-tight material, preferably of rubber. This prevents optical rays from passing directly from the transmitting elements 4, 5 into the receiving element 8 without having been reflected from the window 3.

Figure 4:
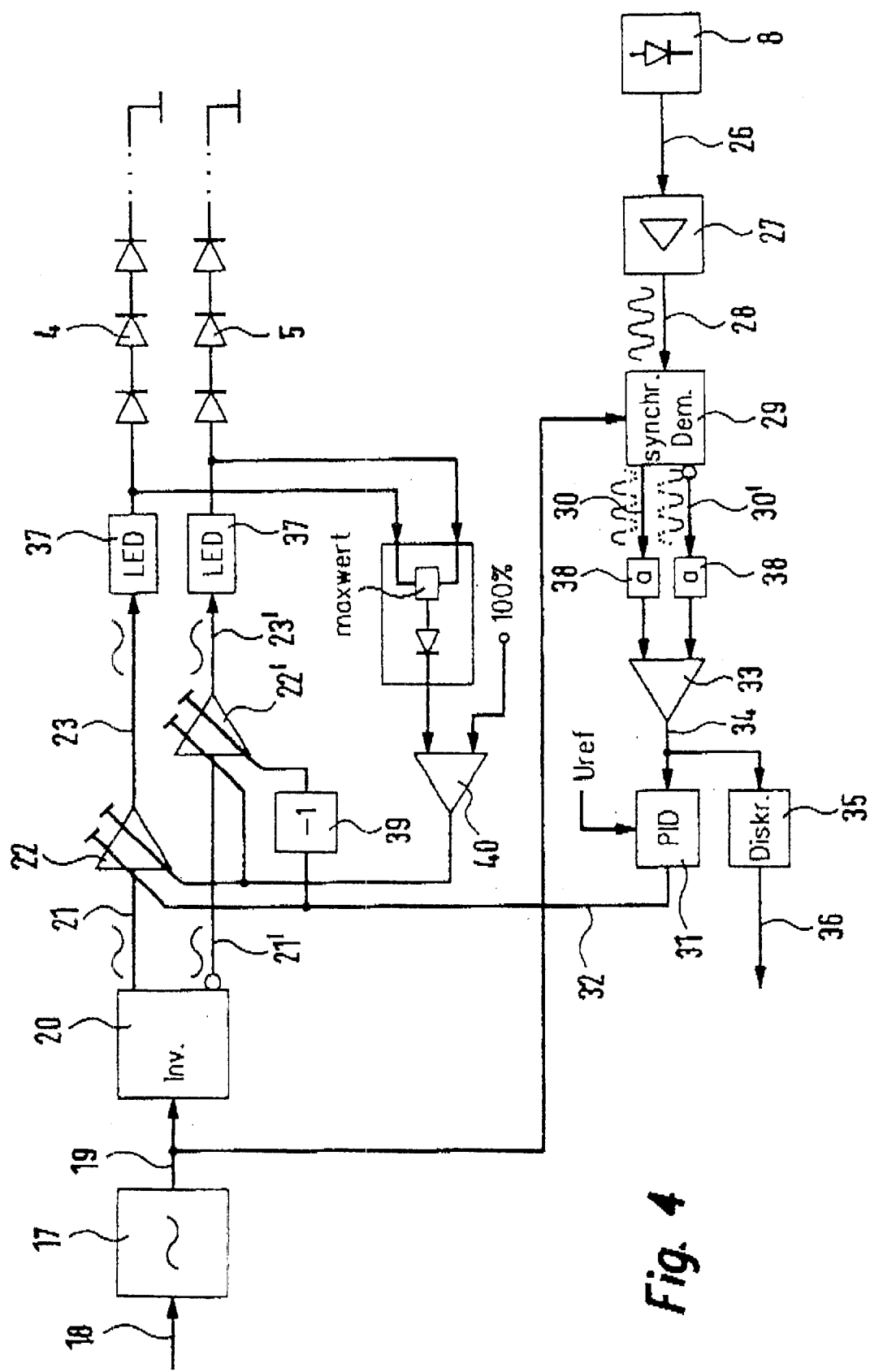
FIG. 4 shows a schematic assembly of a rain sensor in accordance with a second preferred embodiment of the invention.

An additional embodiment of the rain sensor 1 under the invention is shown schematically in FIG. 4. The oscillator 17 is configured as a sine-wave generator. The voltage divider 20 divides the signal 19 from the oscillator 17 into two equally high voltages 21, 21', of which one voltage 21' is generated with inverse phasing to the other signal 21. The amplitude of the voltage signals 21, 21' is regulated in each case by an amplitude control actuator 22, 22' to a specifiable amplitude value. The regulated sine-wave signals 23, 23' are then conducted through respective drivers 37 to the transmitting elements 4, 5, which are configured as light-emitting diodes (LEDs) emitting optical rays 6, 7 in the infrared (IR) range.

The optical rays 9, 10 reflected from or refracted by the windshield 3 to the receiving element 8 are received by the receiving element 8 and converted into an electrical signal 26. The signal 26 is amplified by the amplifier 27. The amplifier 27 has band-pass characteristics in which the mid-frequency lies in the range of the emitted frequency. The amplified signal 28 is demodulated in a synchronous demodulator 29, that is to say, the amplified signal 28 is divided into two differential signals 30, 30', where each of the signals 30, 30' comprises specific half-waves of the amplified signal 28. To control the process, the sine-wave voltage signal 19 generated by the oscillator 17 is fed to the synchronous demodulator 29. The differential signals 30, 30' are integrated upward in an integrator 38 and fed to a comparator 33. Because of the creation of the differential, the output signal 34 from the comparator 33 is independent of any outside light influences on the signal amplitudes of the two signal paths.

The output signal 34 from the comparator 33 is regulated by the PID controller 31 to a reference voltage Uref, for example, 0.5×power supply (U/2). The output signal 32 from the PID controller 31 is taken to the actuators 22, 22', where the two actuators 22, 22' are energized inversely by the inverter 39. This means that when the amplitude of one voltage signal 21 increases, the amplitude of the other voltage signal 21' decreases. Through the automatic control (PID controller 31 and actuators 22, 22') under normal conditions, which means with a dry windshield, both LED output levels are corrected to each other in such a way that following synchronous demodulation in the synchronous demodulator 29, the amplitudes at the comparator 33 input are of equal size. Aging phenomena in the rain sensor 1 components can be compensated for by regulation. The output signal 32 from the PID controller 31 represents the control variable for the actuators 22, 22', and the output signal 34 from the comparator 33 represents the signal variable for the control circuit.

The voltage signals 21, 21' are further regulated through an additional controller 40 in such a way that at least one of the voltage signals 21, 21' always has the maximum amplitude of 100% (maxwert). With a dry windshield, the amplitudes of both voltage signals 21, 21' are at about 100%. In the event that the output signal 34 from the comparator 33 deviates from the reference voltage Uref, only one of the two signal paths S1, S2 is controlled to below 100%, so that the voltage signal 21 of the other path continues to be at 100%. As a result, the efficiency of the rain sensor 1 under the invention can be significantly increased.

Figure 7:
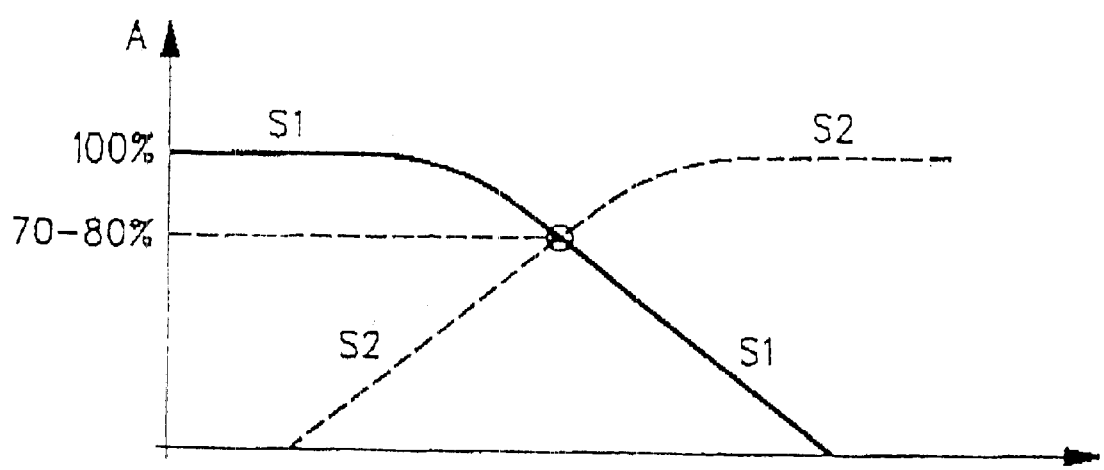
FIG. 7 is a power curve of the voltage signals of two signal paths of a rain sensor known from the prior art.

FIG. 7 shows the pattern of the amplitudes of the voltage signals from two signal paths S1, S2 of a rain sensor known from the prior art. The signal paths S1, S2 each comprise a transmission circuit (from the phase inverter 20 up to the transmitting elements 4, 5) and a receiver circuit (from the receiving element 8 up to the output signal 34 from the comparator 33). The amplitudes of the two voltage signals are regulated in the case of the known rain sensor in such a way that they are at about 70% to 80% of maximum amplitude with a dry windshield. If a drop falls in the measurement area of the rain sensor, the amplitude of one voltage signal is adjusted upward and that of the other downward.

Figure 6:
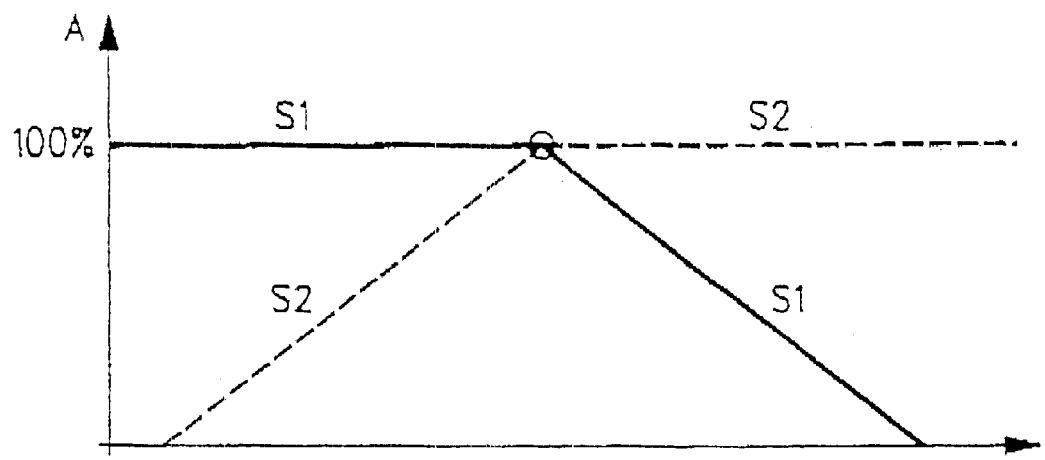
FIG. 6 is a power curve of the sine-wave voltage signals of two signal paths of the rain sensor of the invention.

In contrast, in the case of the rain sensor 1 under the invention with a dry windshield, the amplitudes of the voltage signals 21, 21' from both signal paths S1, S2, are at about 100% (see FIG. 6). In the event that a drop falls on the area measured by the rain sensor, the amplitude of one voltage signal 21 is adjusted downward and that of the other 21' is adjusted upward. Simultaneously, the additional controller 40 becomes active, shifting both amplitudes in such a way that one of the amplitudes is at 100% of the maximum amplitude value (maxwert). This condition with a dry windshield is identified in FIGS. 6 and 7 in each case by a circle.

The output signal 34 from the comparator 33 is taken to a window discriminator 35, whose output signal 36 is then passed on to a vehicle control module for further evaluation. The window discriminator 35 compares the output signal 34 from the comparator 33 with a threshold above the reference voltage Uref and with a threshold below the reference voltage Uref. The output signal 36 from the window discriminator 35 is, for example, a square-Wave signal which has the value LOW in the event that the output signal 34 from the comparator 33 is below the upper threshold and above the lower threshold. In the event that the output signal 34 exceeds the upper threshold or falls below the lower threshold respectively, the output signal 36 from the discriminator 35 assumes a HIGH value. The square shape of the output signal 36 from the discriminator 35 does not result in any radio interference because it has a very low frequency. The PID controller has low-pass characteristics and regulates the output signal 34 relatively slowly (within several seconds) to the reference voltage Uref, so that deviations in the output signal 34 from the reference voltage Uref can be definitely detected from changes in reflection in the signal paths caused by impacting raindrops.

Figure 5:
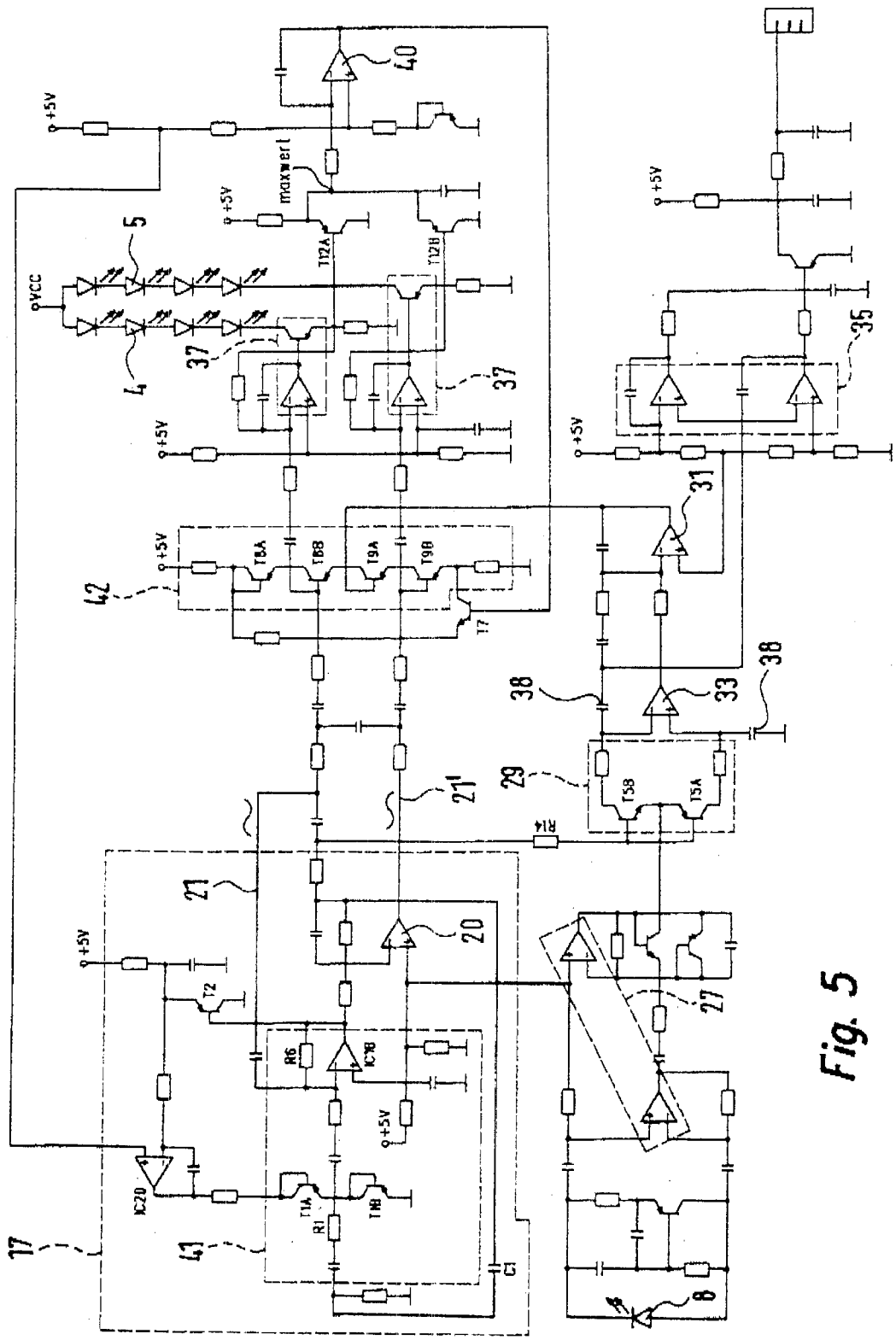
FIG. 5 shows a wiring diagram of the rain sensor of FIG. 4.

FIG. 5 shows a wiring diagram of the rain sensor 1 of the invention from FIG. 4. The components and circuit components are identified with the matching identification numbers from FIG. 4, so that it is easy to assign the numbers. The power supply 18 is +5 volts. A separate more detailed discussion of some components of the wiring diagram from FIG. 5 will follow. The sine-wave oscillator 17 comprises an amplifier circuit 41, whose amplification factor f is derived from the quotient of resistances R6 and R1 (f=R6/R1). The control section of the oscillator amplitudes is created from a transistor T2, an operational amplifier IC2D and transistors T1A, T1B. The synchronous demodulator 29 consists of two transistors T5A, T5B, which are operated through a resistance R14 with a sine-wave switching voltage signal 19.

The control section for amplitude regulation of the signals 21, 21' to each other is identified with the reference number 42 and consists of the four transistors T8A, T8B, T9A and T9B. Regulating to the maximum value of 100% (maxwert) is carried out by two transistors T12A, T12B, the operational amplifier IC2A 40 and a transistor T7.

What is claimed is:

1. A rain sensor for detecting humidity drops within an area on a transparent window, the rain sensor comprising:
   at least one transmitting element for emitting optical rays into the window;
   at least one receiving element for receiving at least one part of the optical rays emitted, wherein the intensity of the optical rays received is dependent on the number of humidity drops in the area of the window observed by the rain sensor; and
   means for generating an electrical signal having a lower harmonic content than a square-wave signal, the generating means supplying the electrical signal to the at least one transmitting element of the rain sensor.

2. The rain sensor in accordance with claim 1, wherein the rain sensor has a plurality of transmitting elements, each of the plurality of transmitting elements grouped in one of two signal paths, and wherein the rain sensor further comprises:
   a comparator to compare the intensity of the optical rays from each signal path received by the at least one receiving element.

3. The rain sensor in accordance with claim 2, wherein the electrical signal is a sine-wave electrical signal, the rain sensor further comprising:
   a voltage divider to divide the sine-wave electrical signal into two sine-wave electrical signals to power respective transmitting elements of the two signal paths.

4. The rain sensor in accordance with claim 3, further comprising:
   a first controller to regulate the amplitude of the individual sine-wave electrical signals so that there is no difference in level between the output signals of the two signal paths.

5. The rain sensor in accordance with claim 4, wherein the first controller is a PID controller.

6. The rain sensor in accordance with claim 3, wherein the voltage divider includes means for shifting the phases of each of the two sine-wave electrical signals by 180 degrees.

7. The rain sensor in accordance with claim 4, further comprising:
   a second controller to jointly regulate both amplitudes of the sine-wave electrical signals so that at least one of the electrical signals always has a specifiable maximum amplitude.

8. The rain sensor in accordance with claim 7 wherein a control loop with the second controller is superposed on a control loop with the first controller.

9. The rain sensor in accordance with claim 2 further comprising:
   a window discriminator to detect deviations in the output signal from the comparator from a constant value and to put out a matching output signal from the rain sensor.

10. The rain sensor in accordance with claim 8, further comprising:
    a synchronous demodulator associated with each of the at least one receiving elements, each synchronous demodulator dividing the signal received by each receiving element into two differential signals, where each of the signals includes specific half waves of the received signal.

11. The rain sensor in accordance with claim 10, further comprising:
    integrators to integrate the differential signals upward.

12. The rain sensor in accordance with claim 1, wherein the at least one receiving element is one centrally-located receiving element and the at least one transmitting element includes eight transmitting elements grouped into two signal paths and positioned around the one centrally-located receiving element at a specific radius.

13. The rain sensor in accordance with claim 1, wherein each of the at least one transmitting element is a luminescent diode.

14. The rain sensor in accordance with claim 1, wherein each of the at least one receiving element is a luminescent diode.

15. The rain sensor in accordance with claim 1 wherein the optical rays are infrared rays.

16. The rain sensor in accordance with claim 10, wherein the synchronous demodulator comprises two transistors operable in response to a sine-wave switching voltage.

17. A method of operating a rain sensor to detect humidity drops within an area on a transparent window, the method comprising the steps of:
- emitting optical rays into the window using at least one transmitting element emits optical rays;
- receiving at least one part of the emitted optical rays using at least one receiving element, wherein the intensity of the received optical rays is dependent on the number of humidity drops in the area of the window observed by the rain sensor; and
- supplying power to the at least one transmitting element using an electrical signal having a lower harmonic content than a square-wave signal.

18. The method in accordance with claim 17, wherein the step of supplying power further comprises the step of supplying power to the at least one transmitting element of the rain sensor using a sine-wave electrical signal.

19. The method in accordance with claim 17 wherein each signal in the rain sensor has a lower harmonic content than a square-wave signal.

20. The method in accordance with claim 19, wherein each signal in the rain sensor is a sine-wave signal.

21. A rain sensor for a transparent window, comprising:
- a transmitting element for emitting optical rays into the window;
- a receiving element for receiving optical rays reflected from the window;
- means for generating an electrical signal and supplying the electrical signal to the transmitting element, the electrical signal having a lower harmonic content than a square-wave signal; and
- processing circuitry for receiving signals from the receiving element and for determining an amount of humidity drops on the window.

* * * * *